United States Patent [19]

Douglas-Hamilton et al.

[11] 4,010,427
[45] Mar. 1, 1977

[54] LASER OUTPUT CONTROL SYSTEM

[75] Inventors: Diarmaid H. Douglas-Hamilton; Ethan D. Hoag, both of Boston, Mass.

[73] Assignee: Avco Everett Research Laboratory, Inc., Everett, Mass.

[22] Filed: Mar. 8, 1976

[21] Appl. No.: 664,656

[52] U.S. Cl. .......................................... 331/94.5 S
[51] Int. Cl.² ........................................ H01S 3/10
[58] Field of Search ................... 331/94.5; 330/4.3

[56] References Cited
UNITED STATES PATENTS 3,702,973  11/1972  Daugherty et al. ............... 331/94.5

*Primary Examiner*—William L. Sikes
*Attorney, Agent, or Firm*—Charles M. Hogan; Melvin E. Frederick

[57] ABSTRACT

A method and apparatus for controlling the power of a laser beam issuing from a gaseous working medium in a working region wherein the gas is subjected to an electric field and an ionizing beam is directed to the gas, ionizing the gas and producing therein secondary electrons sufficient to support laser action wherein the power of the laser beam is controlled by controlling the power of the electron beam and the electron beam power is controlled by an electrical feedback signal from a radiation detector that detects a fraction of the laser beam reflected from a plurality of reflective small wires carried by a rotatable hub which causes the wires to sequentially pass through the laser beam and reflect a small fraction of the laser beam towards the radiation detector.

9 Claims, 7 Drawing Figures

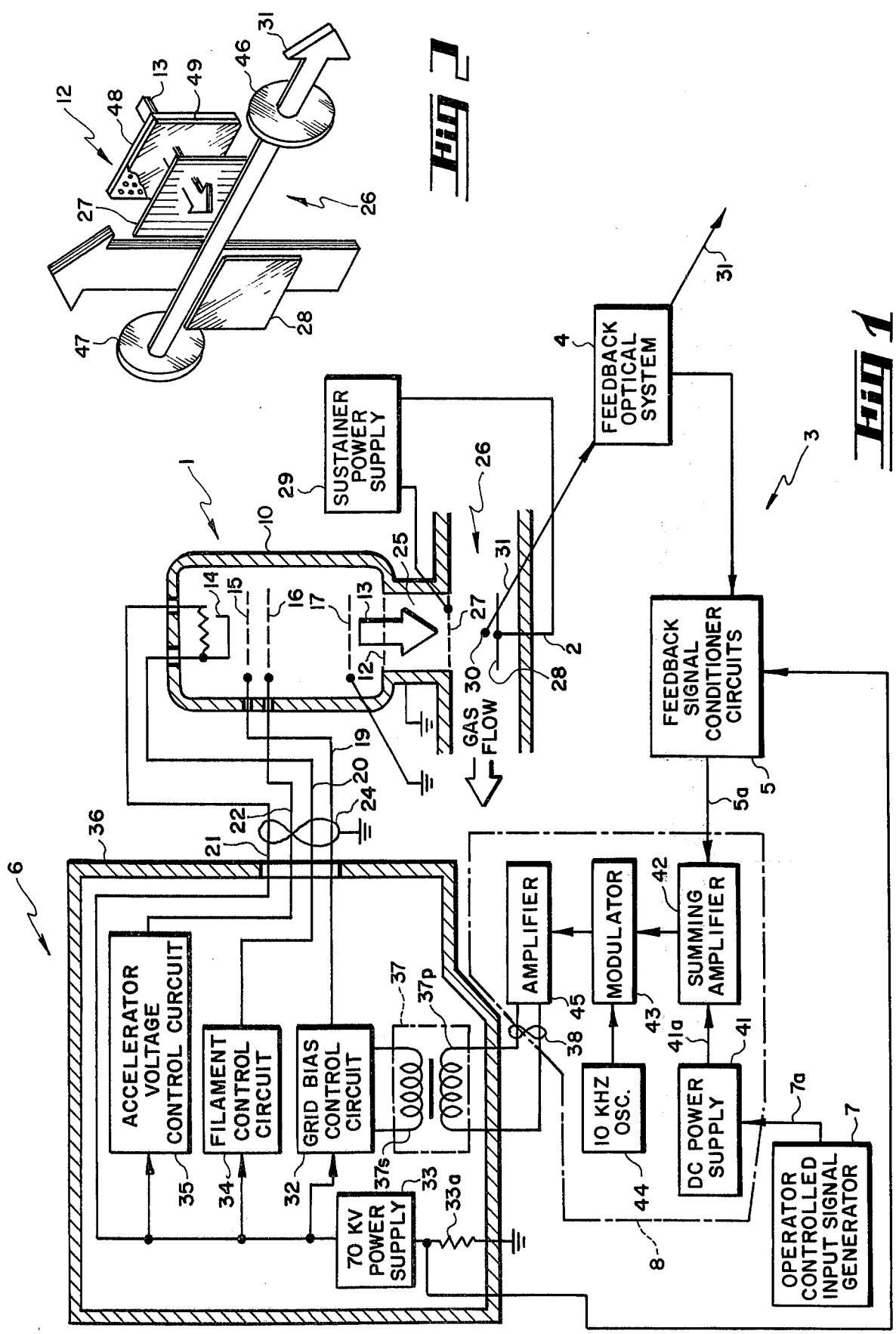

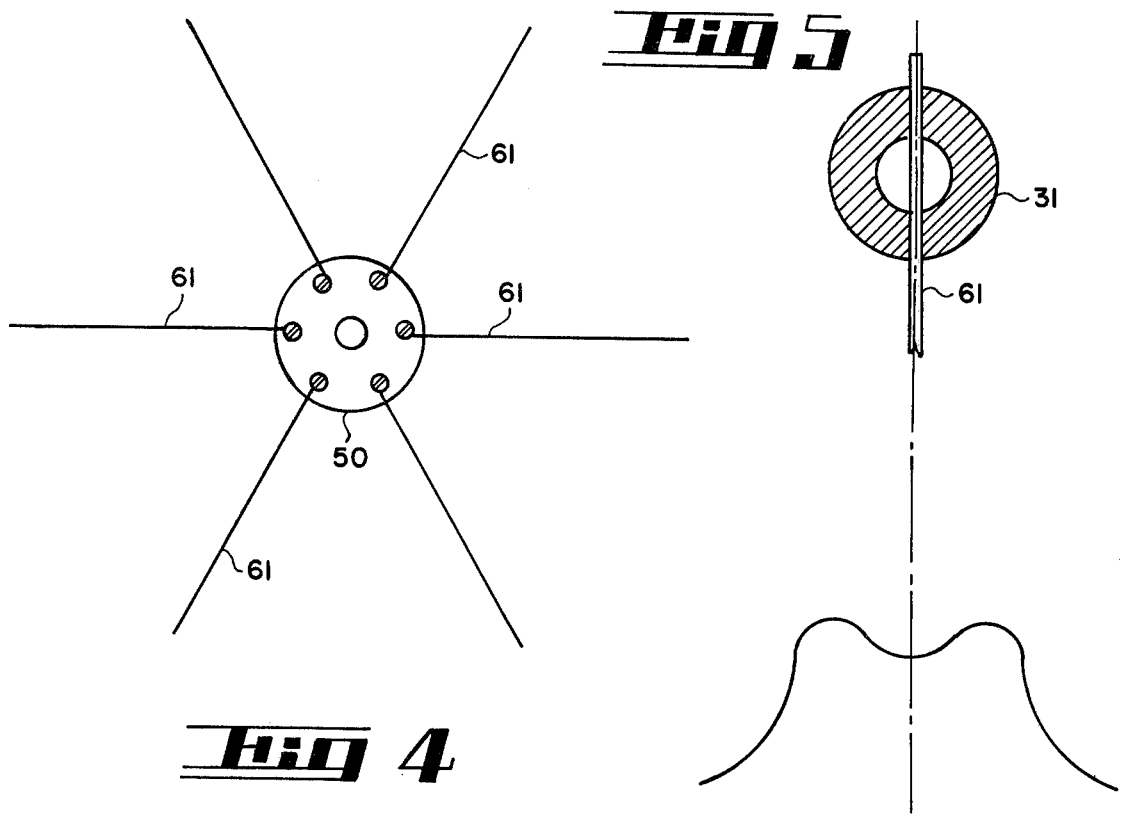
Fig. 4
Fig. 5
Fig. 6
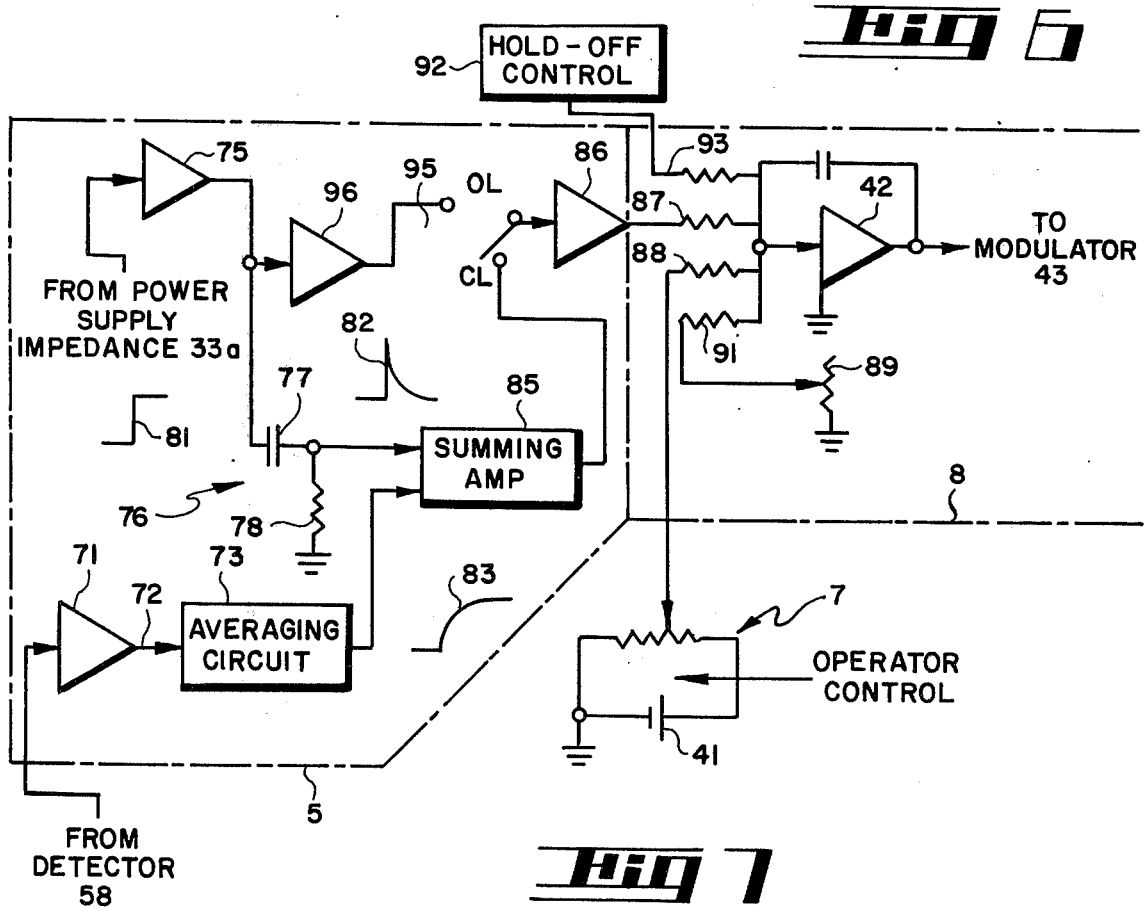
Fig. 7

LASER OUTPUT CONTROL SYSTEM

BACKGROUND OF THE INVENTION

The present invention relates to lasers and more particularly to electric discharge gas lasers (EDL) wherein an electric discharge in a gaseous medium produces a population inversion of energy states in the medium sufficient to support the laser action.

The present invention is an improvement over that shown and described in U.S. patent application, Ser. No. 650,309 filed Jan. 19, 1976 by Jacob L. Zar and Robert E. Serris, and assigned to the same Assignee as this patent application.

A laser beam is a beam of coherent electromagnetic radiation which by virtue of its coherence is highly directional and so the laser beam can be projected great distances with little spreading of the beam. Because the laser beam possesses space coherence, it can be focused to form a small spot. Hence, enormous power densities can be obtained.

An electron beam laser is described in U.S. Pat. No. 3,702,973, issued Nov. 14, 1972 entitled "Laser or Ozone Generator in Which a Broad Electron Beam with a Sustainer Field Produce a Large Area Uniform Discharge" to Daugherty et al. This patent describes a structure and method for operating a relatively large volume, high pressure gas electric discharge gas dynamic laser in which the medium contains $CO_2$. A spacially uniform controlled electric discharge is produced in the working region by introducing ionizing radiation (a broad electron beam) into the laser optical cavity through a wall of the cavity to produce a substantially uniform predetermined density of secondary electrons in the gaseous medium by ionizing the medium. At the same time there is provided a sustainer electric field which is uniform throughout the working region of the laser and which provides a predetermined electron temperature which is calculated to increase the average energy of secondary electrons in the working region without substantially increasing the predetermined electron density in the region. This patent describes a method and structure for producing a uniform controlled discharge in a gaseous medium in a relatively large volume at relatively high pressure. The sustainer field direction, the laser beam direction and the gas flow direction may be mutually orthogonal.

In operation, the ionizing electron beam is generated outside the laser cavity by an E-beam generator and there is a broad area uniform beam of sufficient cross section dimension to cover the relatively large working region of the laser. A suitable structure for generating such a broad area uniform electron beam is described in U.S. Pat. No. 3,749,967 which issued July 31, 1973 entitled "Electron Beam Discharge Device" by Douglas-Hamilton et al. The beam is transmitted into the laser cavity through an electron window and into the working region bounded by the sustainer field. A portion of the laser optical cavity is included in that sustainer field and in the optical cavity.

In the high power electron discharge such as described in the above-mentioned U.S. Pat. No. 3,702,973, the output laser power is approximately proportional to the input power to the sustainer section. The sustainer section includes an anode and a cathode with the gaseous working region in between and so the working region of the laser is defined by this anode and cathode. It is the discharge between the anode and the cathode, uniformly maintained, that pumps the laser and so provides the inverted population of energy states necessary for laser action. Since the laser output power is proportional to the input power to the sustainer, the output power can be controlled by controlling the sustainer voltage. This technique has been effective for gas lasers of smaller size. However, it is not as effective for lasers of larger size, particularly where the laser output power must be changed rapidly. For relatively large electron beam lasers, the density of the electron beam projected into the working region between the sustainer electrodes is controlled while the sustainer voltage is held constant. Thus, the sustainer current is varied to vary output power of the laser. This, in turn, depends upon the ion concentration produced in the working region by the ionizing electron beam.

The ionizing electron beam is produced by the E-beam system which is an external electron accelerating device that generates a broad area electron beam which is projected through an electron window into the working region of the laser. In the E-beam device, electrons emitted by a cathode are accelerated by anodes and so the energy of the electron entering the working region of the laser is determined by the accelerating anode voltage. Usually, the accelerating anode voltage is maintained constant and the voltage on a controlled grid located between the accelerating anodes and the cathode is varied. This control grid controls the density of the electron beam from the device that is projected into the sustainer working region of the laser. Very abrupt changes in the laser output power can be achieved by abruptly changing the voltage on this control grid in the E-beam system. Thus, the E-beam device and the sustainer device operate in conjunction in a fashion similar to a triode or a tetrode vacuum tube to control the output power of the laser, that output power being controlled by a grid potential in the E-beam device.

Heretofore, an electron beam $CO_2$ laser constructed and operated as described above and including an E-beam device and a sustainer has included a null-type feedback control system. The feedback control system detects or senses the current in the electron beam and compares that current with a standard generated by the operator, producing a control signal that reflects the difference. The control signal is applied to the E-beam device control grid. That feedback system, intended particularly to compensate for variations which might result from such things as changes in power line voltage, drifts in component values in the power supply or other factors that could affect the amplitude of the E-beam current. It was not completely effective to correct perturbations in the laser beam output and so, it was less effective than desirable where the output laser beam must be maintained steady and substantially free of perturbations and where the beam power must be changed abruptly as when the beam is pulsed.

In the feedback control system of the aforementioned Zar et al patent application, there is provided a control system for a laser using a feedback loop including an optical system and an electrical system. The combined optical and electrical systems that make up the feedback has particular use in the control of an electron beam laser.

The optical system utilizes mirrors to periodically intercept a laser beam and directs the intercepted radiation through optical attenuators to a radiation detector which produces an electrical signal representative of the power of the periodically intercepted beam and consisting of a series of pulses at the rate of interception of the laser beam. The successive pulses are combined by a conditioning circuit which produces a substantially steady signal level that is proportional to the power of the laser beam. That signal level is compared with a standard signal level controlled by the operator producing a difference signal that is used to control the E-beam device. The difference signal may be amplified and applied directly to the grid of the E-beam device, or as in one embodiment described herein, the difference signal is transmitted by a telemetry transmitter to a telemetry receiver at the location of the E-beam device where the received difference signal is extracted, amplified and applied to control the grid of the E-beam.

The output laser beam is periodically sampled by reflective mirror portions on a rotating wheel which must be disposed at an angle to the laser beam. Because the power reflected by the mirrors is higher than desired, the reflected output beam radiation is first attenuated several orders of magnitude in the optical system and then focused on the radiation detector that produces a signal representative of the power of the reflected radiation.

In one embodiment, there is also included in the signal conditioning circuit that conditions the signal from the radiation detector, means for averaging the electrical signal pulses from the detector. More particularly, the pulse train from the detector is electrically clamped at a level depending on the energy of the successive pulses and then full wave rectified with reference to that level and smoothed to produce a substantially steady output signal, the level of which is indicative of the power of the output laser beam and is substantially free of power line frequency harmonics that appear in the output laser beam. This steady signal level can then be compared with the standard signal level controlled by the operator to produce the difference signal that controls the E-beam device.

In order to make the feedback control system more responsive to abrupt changes in the laser output beam power level, as when the beam is intentionally pulsed, a signal derived from the E-beam device and representative of the E-beam current is differentiated and added to the averaged signal and then the sum of these two is compared with the standard controlled by the operator. The purpose of adding the differential of the E-beam current to the averaged signal derived from the output laser beam is to improve the transient response of the control system. It should be noted that the averaging process is inherently slower than the detector, and while the averaged signal is quite effective to control the laser during substantially steady operation, it is too slow to respond to abrupt changes in the laser output power as when the laser is pulsed. On the other hand, the E-beam device, and more particularly the E-beam current, directly turns the laser beam on and off and this current may even slightly lead the laser beam. Hence, the sum of the differential of the E-beam current and the control signal stabilizes the laser power control circuit and in effect permits a fast response where it is needed.

As may now be seen from the preceding discussion, it is difficult to sample high-power laser beams without markedly affecting the beam power, or indeed totally interrupting it. The use of rotating mirrors as disclosed in the aforementioned Zar et al patent application is subject to many disadvantages. Thus, typically, more energy than is desired is necessarily reflected out of the laser beam; the mirrors must generally be of a considerable size which not only controls the amount of energy reflected, but causes interruption of an appreciable portion of the laser beam; the energy reflected is highly dependent on the cleanliness of the mirror surfaces, surface films and dust, all of which tend to vary in time; and the choice of location of the means for measuring the energy reflected by a mirror is severely limited.

SUMMARY OF THE INVENTION

The present invention is an improved control system for a laser over the control system disclosed and claimed in the aforementioned Zar et al patent application and which may utilize the Zar et al electrical system, but which includes an improved optical system.

In accordance with the present invention, the optical system comprises a rotating wheel or hub carrying a plurality of fine wires radially extending outwardly from the hub and having an outer surface reflective at the wavelength of the laser radiation comprising the output laser beam. The wheel or hub is rotated at a velocity at least sufficient to cause the fine wires to extend substantially radially and sequentially pass through the laser beam. As the fine wires intercept the laser beam they will reflect the laser radiation through substantially all angles. Accordingly, the hub may not only be disposed at almost any desired angle with respect to the longitudinal axis of the laser beam, but the radiaton detector may also be disposed at almost any desired angle with respect to the axis of rotation of the hub. Even with very high power laser beams, attenuation of the laser radiation, including radiation specularly reflected from the wires is typically not necessary. However, for purposes of convenience, specular and scattered reflection comprising a portion of the laser radiation reflected from the wires is collected and focused on the radiation detector to produce an electrical signal representative of the power of the reflected radiation and, hence, the power of the laser beam. Further, the optical system is arranged and adapted to permit simple and quick alignment of its components.

Accordingly, it is an object of the present invention to provide an improved method and means in a laser system for controlling the power of the laser beam.

It is another object of the present invention to provide an improved method and means in an electrical discharge laser system for controlling the power of the laser beam.

It is another object to provide an improved method and means in an electrical discharge flowing gas $CO_2$ laser system for controlling the power of the laser beam.

It is another object to provide apparatus for detecting a laser beam and producing an electrical signal representative of the beam power that is simpler, less expensive and more flexible than prior art apparatus.

These and other objects and features of the present invention will be apparent from the specific description of embodiments of the invention taken in conjunction with the figures described below.

DESCRIPTION OF THE DRAWINGS

FIG. 1 is a diagram illustrating the related structures, system and apparatus for carrying out the process of the present invention in an electron beam flowing gas $CO_2$ laser;

FIG. 2 is a perspective diagrammatic view illustrating the directions of electron generation, gas flow and laser direction in the sustainer or working region of one type of electron beam laser;

FIG. 4 is a front view of the hub and reflecting wires of the optical system;

FIG. 5 is an enlarged view of a reflecting wire of the hub passing through the incident laser output beam;

FIG. 6 is a wave form representing the electrical signal produced by a pyroelectric detector in the optical system as a result of reflection of a reflecting wire as shown in FIG. 5; and FIG. 7 is an electrical block diagram and schematic of the electrical system which is a part of the feedback system.

DESCRIPTION OF EMBODIMENTS OF THE INVENTION

Figure 3:
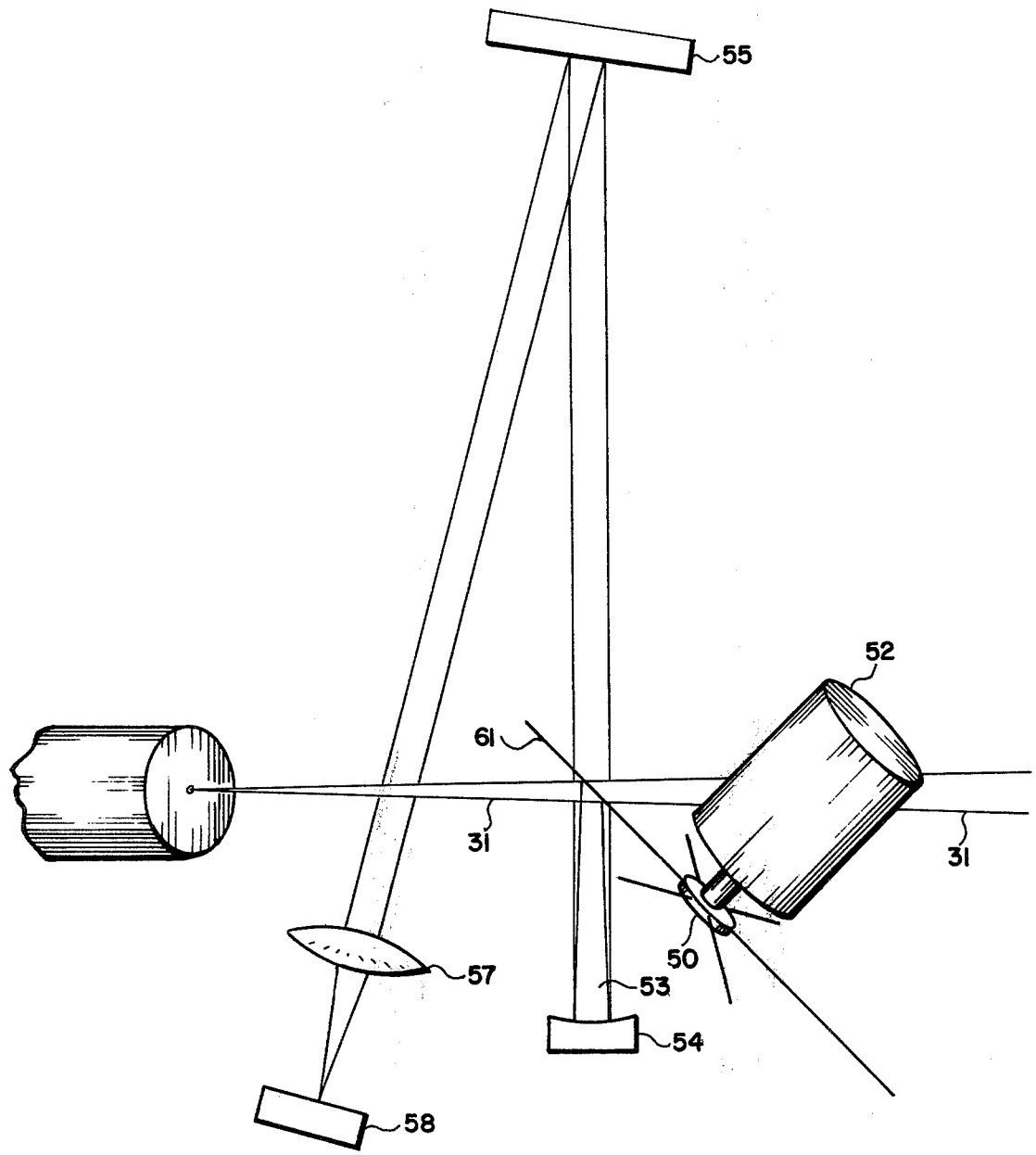
FIG. 3 is a pictorial view of the optical system in accordance with the present invention that is part of the overall feedback system that intercepts a fraction of the laser output radiation for detecting the power thereof and generating the feedback signal.

The diagram in FIG. 1 represents the E-beam generator 1, the sustainer device 2 and the laser working region 26, the feedback control system 3, including the optical and electrical sub-systems thereof, denoted 4 and 5 respectively, the high voltage power supply 6 which supplies power to the E-beam generator, the operator-controlled input 7 and the feedback and input combining and transmitting circuit 8. The purpose of the feedback and the operator-controlled input is to control the electron beam from the E-beam generator that ionizes the gaseous laser medium in the working region of the sustainer. The operator-controlled input signal from control 7 and the electrical feedback signal from the electrical feedback subsystem 5 (herein called the conditioner circuit) are combined in circuit 8 producing the E-beam grid control signal that is transmitted to the high voltage power supply 6 for controlling the grid of the E-beam.

The E-beam generator 1, as briefly represented in FIG. 1, includes an envelope 10 having a vacuum barrier electron window 12 at one end, adapted to permit the electron beam 13 generated within the envelope to emerge from the window. Within the envelope are disposed a cathode 14, a control grid 15 and accelerating anodes 16 and 17. Voltage to these is supplied from the E-beam high voltage power supply 6 via lines 19 to 22 contained in the shielded cable 24. The anode 17 is grounded, cathode 14 is negative with respect to ground and the voltage on anode 16 lies at some fixed potential therebetween. Thus, the density of electrons which flow from the cathode and reach the accelerating field between the anodes 16 and 17 depends upon the voltage on the control grid 15. The electrons accelerated by the accelerating field between the anodes 16 and 17 penetrate the window 12 and emerge from that window as a broad area beam of electrons of reasonably uniform energy, the density of this beam being determined by the grid voltage.

The broad electron beam drifts across the short space 25 which contains the gaseous laser medium at the operating pressure of the laser. Thus, the beam emerges from the vacuum of envelope 10 into a region of substantial gas pressure and penetrates into the working region of the laser, denoted 26. This working region lies between the sustainer electrodes 27 and 28 which are spaced so that the laser gas flows between these electrodes. The laser optical axis 30 also lies between these electrodes and the direction of the laser beam, the direction of gas flow and the optical axis of the laser cavity are mutually orthogonal.

The sustainer electrodes are provided with voltage from the sustainer power supply 29 such that a substantially fixed voltage differential is applied across these electrodes and, so the power to the sustainer electrodes depends upon the impedance therebetween as determined by the density of ions produced in the working region by the incident electron beam 13.

The voltage on the control grid 15 in the E-beam device is controlled by the grid bias control circuit 32, located in the high voltage power supply 6. The cathode 14 of the E-beam is negative with respect to ground at about 70 kv or higher. The cathode connects to the high voltage output of the 70 kv supply 33 in the high voltage power supply 6. The E-beam grid 15 is also at about 70 kv negative, give or take the grid voltage which is determined by the grid control circuit 32. The cathode filament is controlled by the filament control circuit 34 and accelerating anode 16 is controlled by circuit 35, both in the high voltage power supply 6. Thus, the grid, cathode, cathode filament and anode accelerating control circuits and the 70 kv power supply are all contained within the enclosure 36 of the high voltage power supply.

The E-beam control grid voltage may be telemetered to the grid control circuit rather than transmitted to it via hard copper wires. For this purpose, the isolation transformer 37 is the link between the 70 kv voltage level inside the power supply enclosure 36 and the E-beam generator and the outside world.

The feedback system for a laser beam 31 begins with the optical sub-system 4 that intercepts the output laser beam intermittently and directs part of the intercepted portion of the beam to an optical radiation detector that produces electrical signal pulses, each pulse being indicative of the laser beam energy that is intercepted.

The pulses from the radiation detector are fed to the feedback signal conditioner circuits 5. The conditioner circuits respond to the pulses and, in some embodiments of the present invention, respond to other signals derived from the high voltage power supply 6 to produce in the output thereof, in line 5a, a substantially steady electrical signal level that represents at least the steady power level of the laser beam. That signal is fed to the combining and transmitting circuits 8 where it is compared with a signal derived from the operator controlled input signal generator 7 in line 7a, producing a difference signal that is used to control the E-beam grid.

In the combining and transmitting circuits 8, the operator controlled input signal in line 7a controls a DC power supply 41 that produces a standard control signal in line 41a that represents the operator's control signal. This standard signal is compared with the conditioned feedback signal from line 5a by the action of summing amplifier 42. Thus, the output of the summing amplifier reflects the difference of the feedback signal from the standard signal. This difference signal is fed to modulator 43 where it is used to amplitude modulate a 10 kHz signal from oscillator 44. The modulated signal is amplified by amplifier 45 and transmitted or applied directly to the isolation transformer 37 in the high voltage power supply 6. Modulator 43, amplifier 44 and the primary, 37p, of the isolation transformer 37 may be considered as a telemetry transmitter. The modulated 10 kHz signal appearing on the secondary, 37s, of this transformer, is demodulated and applied to the E-beam control grid 15 by the grid bias control circuit 32. In circuit 32, the modulated 10 kHz is rectified by a bridge rectifier, filtered to remove ripple and added to the 70 kv voltage that is applied to the E-beam grid. Thus a closed loop feedback control system is provided which samples the power of the laser beam to provide a feedback signal representative thereof and compares that signal with the output of the operator's control 7 to produce a difference signal. The difference signal is then transmitted to the grid control bias circuit 32 to change the grid voltage as required to change the laser output power to eliminate the difference.

The coordinates associated with the electron beam, the direction of gas flow and the optical cavity of the laser are illustrated in FIG. 2. These directions are named accordingly. The gaseous medium flowing through the device in a direction identified as gas flow, may be, for example, 16% $CO_2$, 34% $N_2$ and 50% He, supplied from a suitable source (not shown). This gas is directed through the working region 26 of the laser optical cavity defined by the laser mirrors 46 and 47. Additional details of the laser, sustainer and E-beam generator are found in the patents mentioned herein.

As described also in U.S. Pat. No. 3,702,973, the inside of the E-beam generator envelope 1 is evacuated so that the broad area electron beam 13 can be formed and controlled therein. This beam is launched towards the reticulated conducting plate 48 which is part of the window 12 in the envelope. The plate 48 may be made of stainless steel or the like and is covered with a thin sheet of a material or diaphragm 49 which possesses adequate structural stability to withstand the pressure differential between the inside of the envelope and the region 25 and yet transmits the maximum number of electrons without absorbing an excessive portion of their energy which would cause a failure of the diaphragm.

The broad area beam 13 emerging from the window 12 into the region 25 passes through a reticulated cathode plate 27 which may be constructed of wire mesh, and into the working region 26. In the working region, electron energy is maintained by the sustainer electric field between the oppositely disposed anode and cathode plates 28 and 27, respectively, which are coupled to the sustainer power supply 29.

The ionizing electron beam thus provided, penetrating into the working region of the laser provides a source of secondary electrons in the working region at a very low electron temperature and increases the efficiency by the electric discharge as is more fully explained in the above-mentioned U.S. Pat. No. 3,702,973. In accordance with the present invention, the electron beam is also controlled by feedback from the output laser beam and, in turn, controls the output power of the laser beam. More particlarly, in accordance with the present invention, the density of the wide area electron beam that penetrates into the working region 26 is electroncially controlled in the E-beam generator 1.

The feedback loop acts to control and keep power in the laser beam constant at the level called for by the operator controlled input signal. The optical sub-system in the feedback loop samples the laser beam power by periodically intercepting the full output beam and directing the intercepted radiation to a radiation detector that produces an electrical signal and from that electrical signal, a feedback electrical signal is derived which is combined with the input signal to control the laser output power. The optical sub-system is shown in FIG. 3 and comprises a hub 50 with radially extending reflective wires 61 driven by a high speed motor 52. Each wire 61 on the hub 50 interrupts the laser beam 31 and reflects only a small portion of the total output power of the beam, only a smaller portion of which is useful and can be utilized. This useful reflected portion of the beam, denoted 53, is directed to a concave mirror 54 having a predetermined and suitable focal length. In order to reduce to a minimum the space necessary to contain the optical system, the useful reflected portion received and reflected from mirror 54 is folded by means of a flat mirror 55. Thus, for the arrangement shown in FIG. 3, concave mirror 54 on one side of the output laser beam 31 directs the useful reflected portion 53 to the other side of the laser beam 31 to the flat mirror 55 which in turn directs the reflected beam back to the opposite side of the laser beam 31 to a focusing lens 57 which focuses the received beam onto a pyroelectric radiation detector 58. Of course, mirrors 54 and 55 are arranged and disposed whereby the path of folded beam 53 does not pass through output laser beam 31 and results in interference therebetween.

Lens 57 is a convex lens or plano-convex lens which focuses the received beam 53 onto the surface of the pyroelectric detector 58. The material of which the lens is made preferably is transparent not only to the laser wavelength being focused, but also to visible light as and for the purposes hereinafter set forth. For an infrared laser, a satisfactory lens may be made of Irtran, zinc selenide or the like. The detector may have an active area about 10 square millimeters or a tenth of a square centimeter. The energy that is received by detector 58 should not be substantially in excess of about 10 watts per square centimeter. Where high energy values are involved, the temperature of the detector should be kept below that temperature at which its function becomes non-linear. For that purpose, cooling fins (not shown) may be connected to the detector and cooled by a flow of air.

While considerable latitude is available for the location and/or orientation of hub 50 and its wires 61, the preferred location is one which permits mirror 54 (or its equivalent) to be of such size and configuration and located such as to receive specular reflection from each wire as it passes through beam 31 as well as the maximum reasonable amount of scattered reflection from each such wire. Thus, by way of example, motor 50 may be disposed at an angle to and under beam 31 such that mirror 54 may be disposed as shown in FIG. 3 as close as reasonably possible to beam 31 to receive specular reflection from each wire. Location of mirror 54 as close as reasonably possible to beam 31 insures that mirror 54 will receive the greatest amount of scattered reflection coincident with specular reflection.

It will be understood by those skilled in the art that at the expense of eliminating the folded path, mirror 55 may be omitted and a conventional convex or plano-convex lens can be substituted for concave mirror 54 to cooperate with lens 57 (appropriately located) to achieve substantially the same results as that achieved with the folded optical system shown and described herein.

Where lenses are used, as previously noted, they advantageously may be transparent to the output laser beam as well as visible light. If detector 58 is removably supported, it may be removed and replaced with a conventional reticule to permit alignment and/or re-alignment where necessary of the optical system to insure that the desired energy consistantly falls on and is received by detector 58. Thus, for maintenance purposes, accessability to the location of detector 58 and substitution of a reticule permits accurate adjustment of the balance of the optical system to image a wire within the confines of the reticule.

As will now be seen, in accordance with the invention a wire disposed in the path of laser beam 31 may be easily and quickly imaged at the location of the detector to insure consistant and dependable operation of the optical system.

The laser beam 31 from a typical electron beam laser such as described in the present application is annular in form. In other words, in the cross section of the beam, the intensity of radiation at the center is low or even zero while towards the edges of the beam, the intensity is much greater. Furthermore, typically, the power density at corresponding points across the beam may be different. For example, around the annulus of the beam at a given radius from the center of the beam, power density may vary. Furthermore, all these variations may be temporal. Thus, in order to insure that the samples of the beam truly represent the full power of the beam, each sample sweeps the whole beam in cross section. It should be noted that the surface of the radiation detector 58 has dimensions on the order of a few millimeters. These requirements of the optical system should all be taken into consideration in the design of each of the parts of the system.

Another important factor that is taken into account in the total feedback loop is that the amplitude of the radiation 53 that is impingent upon the active surface of the pyroelectric detector is pulsed and these pulses have a wave form which has a double hump shape that occurs because of the annular cross section shape of the beam and the way the beam is sampled to produce the pulse. Accordingly, the electric signal pulses from the pyroelectric detector 58 are represented by a wave form which has the same double hump shape.

The reason for the double hump form of the pulses from the detector 58 is illustrated by FIGS. 5 and 6. FIG. 5 is an enlarged view of one of the wires 61 of the hub passing through the output laser beam 31. The sampling hub, as shown also in FIG. 4, may have six or more equally spaced reflective wires. Preferably, the wires are spaced one from another such that the laser beam in the spaces between wires clears the wires and at this time, none of it is intercepted by a wire or wires. The relationship between the number of wires or openings in the sampling hub, the speed of rotation of the wheel and the frequency of the electric power that energizes the electrical parts of the laser is described hereinbelow.

Referring again to FIGS. 4, 5, and 6, each wire 61 of the hub 50 is a radiation reflector. The reflector wires extend radially from the hub and have an outer surface that is highly reflective of radiation at the wavelength of the laser beam. For example, if the laser radiation wavelength is on the order of 10.6 microns, then the reflector wires may, for example, be made of platinum or be gold-plated platinum. These are examples of but a few suitable materials.

The hub is preferably located, and the reflector wires are long enough, to span the full dimension of the laser beam 31 when the wires pass across the beam. Hub 50, and hence the wires 61, need not be disposed at any particular angle to the laser beam since the wires reflect radiation at all angles. It is necessary, however, that the length of the wires be greater than the cross section dimension of the beam in order that all of the beam be intercepted by the wires when the wires cross the beam.

A material for the wires must be selected to withstand the selected rate of rotation of the hub, which rate is preferably at least high enough to cause the wires to stand straight or at least substantially straight out from the hub. A wire radius of $10^{-2}$ cm for platinum has been found satisfactory as has 0.008 inch diameter for tungsten wires. By way of example, the hub may have a diameter of 2 inches and the wires a length of 8 inches.

While the number of wires used may vary, typically a sampling may be provided every $6 \times 10^{-4}$ seconds for a laser beam diameter of 1 centimeter. Further the number and diameter of wires are preferably selected to result in a negligible ripple in the laser beam.

Where the invention is to be used with lasers having a high energy output laser beam, the effect of heat transfer to the wires from the laser beam and heat transferred from the wires by convective cooling is important. Accordingly, the absorptivity of the surface of the wires must be such that a detrimental increase in wire temperature will not occur during use. Consideration of this characteristic will, of course, at least in part permit selection of the proper outer surface of the wires and a rate of rotation.

The provision of a hub and reflector wires in accordance with the present invention has the substantial advantages, as compared with prior art devices, such as the wheel of the aforementioned Zar et al. application, of permitting wide variation in the location and orientation of the wires, the use of greater rotational speeds and, hence, less ripple in the laser beam, and the interception of considerably less radiation. Further, the availability of much higher rotational speeds permits considerably greater control of the laser beam power.

Turning now to FIG. 7, there is shown an electrical block diagram and schematic of the electrical part of the feedback system including the signal conditioner circuit 5 and portions of the input combining and transmitting circit 8, shown also in FIG. 1. These circuits respond to three inputs; first, one from the pyroelectric detector 58; second, another from the operator-controlled input signal generator 7 that sets the laser beam output power; and third, a signal derived from the E-beam system that represents the E-beam current and may be derived from the 70 kv power supply 33. The nature of these signals and the way they are combined by the electrical sub-system of the feedback system are explained below.

The detector 58 has a high impedance. This is important because there may be a considerable length of cable from the detector to other circuit components so the cable capacitance would be significant and would effectively load down the detector reducing the output signal level. To reduce this problem, the output of the detector is fed directly to a preamplifier 71 in close proximity to the detector. The preamplifier serves as a buffer between the detector and the cable 72 that carries the detected signals. Hence, the cable does not load down the detector and reduce the signal level from the detector. Pre-amplifier 71 is a conventional operational amplifier which characteristically has a high input impedance and a low output impedance. The signal from the detector consists of a series of pulses, one each time a reflective wire 61 crosses the output laser beam 31.

Since the laser beam has an annular shape (it is as of the present more or less hollow), as an elongated wire 61 swings across the beam, it intercepts a varying amount of radiation and so the reflected laser beam 54 is pulsed and each pulse has the characteristic shape shown in FIG. 6. More particularly, the pulse may exhibit two humps, one at the initiation and one at the end of the pulse, because more radiation is intercepted by the wire at the beginning and the end of the pulse than at the middle of the pulse. Furthermore, the power density at corresponding points across the beam may be different and may vary and the variation may be temporal. These characteristics of the intercepted laser beam and, hence, of the reflected radiation have been explained above. The result, however, is that the pulses at the output of detector 58 will not be uniform nor will each pulse be symmetrical. The problem then becomes to derive a signal from the pulses which is steady when the laser beam power is steady even though there are transient, spatial and temporal intensity fluctuations in the beam. For this purpose, a conventional averaging circuit 73 is provided.

Simultaneously, as the output laser beam rises in response to a change in E-beam current, the amplitude of the pulses from detector 58 also rises and so does the output DC signal level from the averaging circuit. The response of the averaging circuit is inherently slow by comparison to the response of other parts of the system. Clearly, the averaging circuit cannot react as rapidly as other parts of the system, because if it did, the laser power output beam would oscillate at the pulse rate frequency of the pulse train from the detector or, possibly, at a higher frequency. One purpose of the averaging circuit is to remove the pulse rate frequency of the pulses from the detector.

The relatively slow response rate of the averaging circuit means that when the laser output beam power changes abruptly from one level to another, the DC signal level from the averaging circuit will not immediately follow the change. Hence, during transient operation of the laser system, as when the laser output beam power level is intentionally changed from one level to another, the feedback signal from the averaging circuit is inadequate. Comparing such an inadequate feedback signal with the input control signal from generator 7 by the summing amplifier 42 would produce a control signal to the E-beam device calling for more E-beam current that necessary and so the whole system would overload and perhaps oscillate back to stability depending upon the time constants of the system.

This tendency to overload when an abrupt change in laser output power is called for is compensated for by adding the differential of E-beam current to the output of averaging circuit 73. For this purpose, a signal is obtained from the E-beam system that represents the E-beam current. That signal may be obtained from across the power supply impedance 33a (see FIG. 1). The E-beam signal is fed to a conventional non-inverting buffer amplifier 75 in the signal conditioning circuit 5 and the output of that amplifier is differentiated by a conventional differentiating circuit 76 which may consist simply of a capacitor and resistor 77 and 78, respectively, as shown. Where, for example, the E-beam current experiences an abrupt change represented by the waveform 81, then the differential is represented by waveform 82. Meanwhile, the output signal from averaging circuit 73 will appear as represented by waveform 83. Clearly, the differential signal, waveform 82, is the converse of the signal from the averaging circuit and, so by summing these two signals in summing amplifier 85, a conditioned feedback signal is produced which approximates the step function (waveform 81) of the E-beam current during transient conditions and also provides a steady signal during steady operating conditions unaffected by the spatial and temporal fluctuations of the beam.

The summing amplifier 85 that produces the conditioned feedback signal may be a conventional operational amplifier having high input impedance and low output impedance and that reverses the phase of the input summation. This output is fed through another conventional operational amplifier 86 to again reverse phase so there is no phase reversal of the signal from the averaging circuit 73, and the output of amplifier 86 is fed to one input of a conventional summing amplifier 42 in the combining and transmitting circuits 8. This summing amplifier may have several inputs. One input is the conditioned feedback signal from amplifier 86 that is fed to input resistor 87 and another input is the operator-controlled input signal from generator 7 that is fed to input resistor 88. Other inputs to summing amplifier 42 may include: an offset input from variable potentiometer 89 to input resistor 91 and the hold-off signal from the stand-by signal generator 92 fed to input resistor 93.

The purpose of the offset signal is to compensate for slight DC voltages appearing in any of the other input signals and which are not desired. The purpose of the stand-by signal is to hold off all signals to the summing amplifier so that the grid bias control voltage for the E-beam device produced by control circuit 32 in the high voltage power supply 6 (see FIG. 1) cuts off the E-beam and no current flows in the E-beam. For example, when the laser system is in the standby condition, it is desired that all systems be activated except the E-beam current. Then when the laser is started, the hold-off voltage is removed and the E-beam current rises to the value called for by the operator-controlled input signal. Clearly, the offset signal and the hold-off signal are incidental to the operation of specific laser systems incorporating the present invention and they could be omitted in some cases.

An optional part of the conditioning circuit 5 includes the switch 95 that feeds the conditioned feedback signal to amplifier 86 from operational amplifier 96 or summing amplifier 85. Switch 95 has two positions: the closed loop position, denoted CL, and the opened loop position, denoted OL. In the closed loop position, the conditioned feedback signal from summing amplifier 85 is fed to summing amplifier 42 and so the complete feedback system is fully effective as described hereinabove to stabilize control of the output laser beam. When the switch is in the opened loop position, the feedback system, including the optical sub-system 4 and the signal conditioned circuit 5 are by-passed and the signal from the E-beam current sensor (impedance 33a shown in FIG. 1) is fed directly to summing amplifier 42 through amplifier 86. The purpose of amplifier 96 is to provide a second reversal of the E-beam current signal. The opened loop feedback clearly ignores the power of the laser beam and attempts to provide control using only feedback from the E-beam system itself without regard for the real output of the system. Hence, the opened loop feedback is less effective than the closed loop feedback and may be provided as a back-up feedback control signal in case of failure of the closed loop system.

The summing amplifier 42 is an operational amplifier of conventional design including a number of input impedances already described that feed at least one stage as shown in FIG. 7. The output may be used to directly control the bias on grid 14 of the E-beam device as shown in FIG. 1. For reasons already described, the output of amplifier 42 is preferably not directly connected to the grid bias control circuit 32 by hard copper wires. It is preferred that it be isolated from the grid bias control circuit because of the high voltage environment of the grid bias control circuit. Hence, as shown in FIG. 1, the output of the summing amplifier 42 is first fed to modulator 43 where it modulates a 10 kHz signal and the modulated signal is amplified by amplifier 45 and applied across the primary winding 37p of transformer 37. The secondary winding 37s in transformer 37 connects directly to grid bias control circuit 32 and imposes a bias signal on the grid voltage that is equivalent to the output signal from summing amplifier 42. In this way, the differential signal between the conditioned feedback signal and the operator-controlled input signal controls the E-beam current density. A null is produced when the two signals are equal which means that the output laser beam is at the power level called for by the input signal. When the conditioned feedback signal exceeds the input signal, the differential signal reduces the E-beam density which, in turn, reduces the output laser beam power. Likewise, when the input signal exceeds the conditioned feedback signal, the E-beam density is increased, increasing the output laser beam power until it meets the level called for by the input signal.

For a more complete discussion and understanding of the electrical part of the feedback system, reference is made to the aforementioned patent application, Ser. No. 650,309, filed January 19, 1976 by Zar et al.

The embodiments of the present invention described herein show a method and apparatus for controlling the output of an electron beam-sustainer-type laser with a feedback system that detects the output power of the laser beam. The details of the electron beam-sustainer-type laser described herein, as well as a number of details of both the optical and the electronic aspects of the feedback system are given by way of example of the best-known use of the invention and are not intended to limit the spirit or scope of the invention as set forth in the appended claims.

What is claimed is:

1. In a method of producing a coherent beam of radiation from a gaseous medium in an enclosure, the steps comprising:
   a. providing said gaseous medium at a predetermined pressure in a working region in the enclosure;
   b. generating external of said enclosure a substantially broad area electron beam having a cross section area conforming substantially to said working region;
   c. introducing said electron beam to said enclosure to produce in the working region a substantially spatially uniform predetermined density of secondary electrons in the medium;
   d. providing an electric field in the working region which increases the average energy of said secondary electrons therein without substantially increasing the electron density therein;
   e. the energy of said secondary electrons being sufficient to stimulate the emission of said coherent beam of radiation;
   f. causing said beam of coherent beam of radiation to emanate from the enclosure;
   g. sequentially intercepting the emanating beam of coherent radiation at substantially regular intervals by elongated small diameter wires spaced one from another and having an outer surface substantially reflective to said coherent radiation to provide reflected pulses of radiation;
   h. collecting and converting said reflected pulses of radiation into an electrical feedback signal representative of the power thereof; and
   i. employing said electrical feedback signal to control the electron beam, thereby providing a feedback system for controlling the coherent beam of radiation.

2. A method as in claim 1 further including the steps of:
   a. providing an input signal;
   b. combining said input signal with said feedback signal; and
   c. employing said combined signals to control the electron beam.

3. A method as in claim 2 wherein:
   a. the combining of said signals produces a difference signal which is proportional to the difference between the combined signals; and
   b. the difference signal controls the electron beam.

4. A method as in claim 3 wherein:
   a. at each interception of the beam of radiation, the whole beam is intercepted.

5. A method as in claim 4 wherein:
   a. the cross section of each wire is substantially less than the cross section of the beam of radiation; and
   b. during said interception, all areas of the cross section of the beam are intercepted by each wire.

6. A method as in claim 1 wherein:
   a. said wires are caused to pass through and intercept the whole emanating beam; and
   b. only a portion of the total radiation reflected by each said wire is collected, each said portion comprising spectral and scattered radiation.

7. A method as in claim 1 further including the steps of:
   a. causing said wires to pass through and intercept the whole emanating beam;
   b. collecting spectral and scattered radiation reflected by each said wire as it passes through said emanating beam; and
   c. directing said collected spectral and scattered radiation to a radiation responsive device that converts the energy of the radiation to an electrical signal and converting said directed radiation to an electrical signal to produce said electrical feedback signal.

8. A method as in claim 7 wherein:

a. the collected spectral and scattered radiation reflected by each wire is collected adjacent said emanating beam.

9. A method as in claim 8 wherein:

a. said collected radiation is directed to said radiation responsive device through a lens transparent to visible light and said emanating beam whereby when visible light is directed on a wire located within the space occupied by said emanating beam, said wire may be imaged at the point of location of said radiation responsive device for alignment purposes.

* * * * *